UNITED STATES PATENT OFFICE 2,221,275

HALO-ALIPHATIC ESTERS OF 2-CHLORO-ALLYL ALCOHOL

Fred Lowell Taylor, Midland, Mich., assignor to The Dow Chemical Company, Midland, Mich., a corporation of Michigan No Drawing. Application July 17, 1939, Serial No. 284,921

9 Claims. (Cl. 260—487)

This invention concerns a new class of chemical compounds, namely the esters of 2-chloroallyl alcohol and halogenated carboxylic acids of the aliphatic series. Such esters may be represented by the general formula

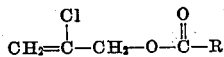

wherein R represents a halogenated alkyl radical, i. e., an alkyl radical containing one or more halogen substituents. Examples of such esters are 2-chloroallyl chloroacetate, 2-chloroallyl alpha, beta-dibromopropionate, 2-chloroallyl alpha-chlorolaurate, 2-chloroallyl beta-bromocaproate, 2-chloroallyl gamma-bromobutyrate, 2-chloroallyl alpha-chloroisobutyrate, 2-chloroallyl alpha, alpha'-dichloroisovalerate, 2-chloroallyl trichloroacetate, 2-chloroallyl alpha-bromostearate, 2-chloroallyl gamma-bromocaprylate, etc. All such esters are useful as modifying agents in the polymerization of vinyl compounds and vinylidene halides, and as intermediates in the preparation of other organic chemicals.

The new esters having the above general formula may be prepared by reacting 2-chloroallyl alcohol with a halogenated aliphatic acid or its anhydride. The reaction is preferably carried out by heating a mixture of 2-chloroallyl alcohol and the desired acid or acid anhydride to a temperature of approximately 90°–150° C. If desired, a small proportion, e. g., 0.01–0.04 molecular equivalent, of an esterification catalyst, such as sulphuric acid, benzene sulfonic acid, etc., may be employed. When 2-chloroallyl alcohol is reacted with a halogenated aliphatic acid, water is formed during the reaction, and, if desired, a water-immiscible organic liquid, such as benzene, toluene, methylene chloride, etc., may be added to the reaction mixture for the purpose of promoting distillation and removal of the water. The reaction is usually complete in from 3 to 15 hours, after which the mixture is neutralized, washed with water, and dried, and the ester product is separated and purified by fractional distillation.

An alternative method for the preparation of the new esters comprises reacting 2-chloroallyl alcohol with a halogenated aliphatic acid halide, such as chloroacetyl chloride, alpha-chloropropionyl bromide, etc. The reaction is preferably carried out by gradually adding the acid halide to the alcohol while heating the mixture to a reaction temperature of approximately 30°–120° C. Upon completion of the reaction, the mixture is neutralized, washed with water, and the ester product is separated as hereinbefore described.

The following examples illustrate a number of ways in which the principle of the invention has been applied, but are not to be construed as limiting the same:

Example 1

A mixture of 92.5 grams (1.0 mole) of 2-chloroallyl alcohol and 100 grams (1.06 moles) of chloroacetic acid was heated at a temperature of approximately 85° C. for 20 hours in a flask fitted with a dropping funnel, condenser, and receiver arranged in such a manner as to permit distillation of water from the mixture. During the heating, methylene chloride was added drop-wise to facilitate the distillation of water. Upon completion of the reaction, the methylene chloride was distilled off and the crude ester product was neutralized with aqueous sodium bicarbonate, washed with water, and dried over anhydrous calcium chloride. The product was then fractionally distilled under vacuum whereby 2-chloroallyl chloroacetate was obtained as a water-white liquid distilling at approximately 75°–77° C. under 5 millimeters pressure and having a specific gravity of about 1.3077 at 25/25° C. and an index of refraction, $$n_D^{25} = 1.4691$$

2-chloroallyl chloroacetate was also prepared by warming a mixture of 92.5 grams (1.0 mole) of 2-chloroallyl alcohol and 175 grams (1.0 mole) of chloroacetic anhydride on a steam bath for about ¾ hour and thereafter purifying and separating the ester product as described above.

Example 2

2-chloroallyl chloroacetate was prepared from chloroacetyl chloride in the following manner:

1450 grams of chloroacetyl chloride was added gradually with stirring to 983 grams of technical 2-chloroallyl alcohol while maintaining a reaction temperature of approximately 30°–35° C. When all of the chloroacetyl chloride had been added, the temperature was gradually raised to 95° C. over a period of three hours, after which time the mixture was cooled, washed with water and aqueous sodium bicarbonate, and dried over anhydrous potassium carbonate. The 2-chloroallyl chloroacetate product was separated and purified by fractional distillation.

Example 3

A mixture of 92.5 grams (1.0 mole) of 2-chloroallyl alcohol and 54.5 grams (0.5 mole) of alpha-chloropropionic acid was heated at approximately 90°–160° C. for 1½ hours. The excess alcohol was then distilled off and the crude ester product was neutralized with aqueous sodium bicarbonate, washed with water, dried over anhydrous potassium carbonate, and fractionally distilled under vacuum. There was obtained 2-chloroallyl alpha-chloropropionate, a colorless liquid distilling at approximately 72°–74° C. under 5 millimeters pressure and having a specific gravity of about 1.243 at 25/25° C. and an index of refraction, $$n_D^{25} = 1.4604$$

*Example 4*

25.4 grams (0.2 mole) of beta-chloropropionyl chloride was added gradually with stirring to 20.0 grams (0.22 mole) of 2-chloroallyl alcohol while maintaining a reaction temperature of approximately 80°–90° C. The mixture was then heated at reflux temperature for ½ hour to drive off hydrogen chloride, and was distilled under vacuum whereby there was obtained 2-chloroallyl beta-chloropropionate, a colorless liquid distilling at approximately 122° C. under 32 millimeters pressure and having a specific gravity of about 1.254 at 25/25° C. and an index of refraction, $$n_D^{25} = 1.5229$$

*Example 5*

A mixture of 23.2 grams (0.1 mole) of alpha,beta-dibromopropionic acid, 50.0 grams (0.54 mole) of 2-chloroallyl alcohol, and 0.2 gram of concentrated sulphuric acid was heated at a temperature of approximately 75°–80° C. for 17 hours while distilling off water with methylene chloride as in Example 1. The methylene chloride was removed by distillation and the ester product was dried over anhydrous potassium carbonate and was purified by fractional distillation under vacuum. 2-chloroallyl alpha,beta-dibromopropionate was obtained as a colorless liquid distilling at approximately 154°–157° C. under 30 millimeters pressure and having a specific gravity of about 1.803 at 25/25° C. and an index of refraction, $$n_D^{25} = 1.5229$$

*Example 6*

A mixture of 68.2 grams (0.5 mole) of alpha-chloro-alpha-methyl-butyric acid and 92.5 grams (1.0 mole) of 2-chloroallyl alcohol was heated at approximately 150° C. for 1½ hours. Excess alcohol was distilled from the reaction mixture and the latter was washed, neutralized, dried, and fractionally distilled as in Example 3. There was obtained 2-chloroallyl alpha-chloro-alpha-methyl-butyrate, a colorless liquid distilling at approximately 80°–82° C. under 4 millimeters pressure, and having a specific gravity of about 1.162 at 25/25° C. and an index of refraction, $$n_D^{25} = 1.4590$$

The following table describes several other 2-chloroallyl esters of the present class, each of which was prepared by a procedure similar to that described above.

*Table*

| Compound | Formula | Boiling point ° C. | Mm. Hg. | Specific gravity at 25/25° C. | Refractive index $n_D^{25}$ |
|---|---|---|---|---|---|
| 2-chloroallyl alpha-chloroisovalerate | $CH_2=\overset{Cl}{\underset{|}{C}}-CH_2-O-\overset{O}{\underset{\|}{C}}-\overset{Cl}{\underset{|}{CH}}-\overset{CH_3}{\underset{|}{CH}}-CH_3$ | 87–88 | 4 | 1.159 | 1.4592 |
| 2-chloroallyl alpha-chloro-n-butyrate | $CH_2=\overset{Cl}{\underset{|}{C}}-CH_2-O-\overset{O}{\underset{\|}{C}}-\overset{Cl}{\underset{|}{CH}}-CH_2-CH_3$ | 75–76 | 3 | 1.194 | 1.4598 |
| 2-chloroallyl dichloroacetate | $CH_2=\overset{Cl}{\underset{|}{C}}-CH_2-O-\overset{O}{\underset{\|}{C}}-\overset{Cl}{\underset{|}{\underset{Cl}{CH}}}$ | 92–96 | 14 | ---------- | 1.4833 |
| 2-chloroallyl trichloroacetate | $CH_2=\overset{Cl}{\underset{|}{C}}-CH_2-O-\overset{O}{\underset{\|}{C}}-\overset{Cl}{\underset{|}{\underset{Cl}{C}}}-Cl$ | 79–81 | 5 | 1.481 | 1.4838 |
| 2-chloroallyl bromoacetate | $CH_2=\overset{Cl}{\underset{|}{C}}-CH_2-O-\overset{O}{\underset{\|}{C}}-\overset{Br}{\underset{|}{CH_2}}$ | 80–82 | 5 | 1.610 | 1.4934 |
| 2-chloroallyl alpha,beta-dibromo-n-butyrate | $CH_2=\overset{Cl}{\underset{|}{C}}-CH_2-O-\overset{O}{\underset{\|}{C}}-\overset{Br}{\underset{|}{CH}}-\overset{Br}{\underset{|}{CH}}-CH_3$ | 156–159 | 28 | 1.631 | 1.5113 |

This application is a continuation-in-part of my co-pending application, Serial No. 232,007, filed September 27, 1938.

Other modes of applying the principle of my invention may be employed instead of those explained, change being made as regards the materials employed or the methods disclosed, provided the products stated by any of the following claims or the equivalent of such stated products be obtained.

I therefore particularly point out and distinctly claim as my invention:

1. An ester of 2-chloroallyl alcohol and a halogenated carboxylic acid of the aliphatic series.

2. An ester of 2-chloroallyl alcohol and a chlorinated acid of the aliphatic series, said ester having the general formula

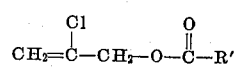

wherein R' represents a chlorinated alkyl radical.

3. An ester of 2-chloroallyl alcohol and a brominated carboxylic acid of the aliphatic series, said ester having the general formula

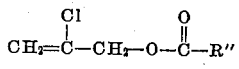

wherein R'' represents a brominated alkyl radical.

4. An ester of 2-chloroallyl alcohol and an alpha-halo-aliphatic acid, said ester having the general formula

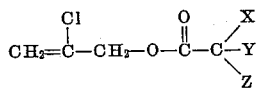

wherein X represents a halogen substituent selected from the group consisting of chlorine and bromine, Y represents a substituent selected from the group consisting of hydrogen and the same halogen as X, and Z represents a substituent selected from the group consisting of alkyl radicals and hydrogen.

5. An ester of 2-chloroallyl alcohol and an alpha-chloro-aliphatic acid, said ester having the general formula

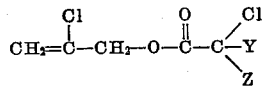

wherein Y represents a substituent selected from the group consisting of hydrogen and chlorine, and Z represents a substituent selected from the group consisting of alkyl radicals and hydrogen.

6. An ester of 2-chloroallyl alcohol and an alpha-chloro-aliphatic acid, said ester having the general formula

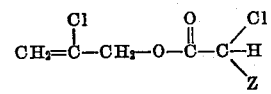

wherein Z represents a substituent selected from the group consisting of alkyl radicals and hydrogen.

7. 2-chloroallyl chloroacetate, a colorless liquid distilling at approximately 75°–77° C. under 5 millimeters' pressure and having a specific gravity of about 1.3077 at 25/25° C. and the formula

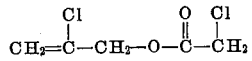

8. 2-chloroallyl alpha-chloropropionate, a colorless liquid distilling at approximately 72°–74° C. under 5 millimeters' pressure and having a specific gravity of about 1.243 at 25/25° C. and the formula

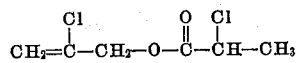

9. 2-chloroallyl alpha-chloro-n-butyrate, a colorless liquid distilling at approximately 75°–76° C. under 3 millimeters' pressure and having a specific gravity of about 1.194 at 25/25° C. and the formula

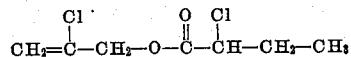

FRED LOWELL TAYLOR.

CERTIFICATE OF CORRECTION.

Patent No. 2,221,275.  November 12, 1940.

FRED LOWELL TAYLOR.

It is hereby certified that error appears in the printed specification of the above numbered patent requiring correction as follows: Page 2, first column, line 52, Example 4, for "$n_D^{25} = 1.5229$" read --$n_D^{25}=1.4670$--; and that the said Letters Patent should be read with this correction therein that the same may conform to the record of the case in the Patent Office.

Signed and sealed this 21st day of January, A. D. 1941.

(Seal)

Henry Van Arsdale,
Acting Commissioner of Patents.